United States Patent [19]

Hisatsune et al.

[11] 4,263,484
[45] Apr. 21, 1981

[54] MICROPHONE UNIT

[75] Inventors: Yoshinobu Hisatsune, Nagoya; Masaharu Suzuki, Mizunami, both of Japan

[73] Assignee: Aiphone Co., Ltd., Japan

[21] Appl. No.: 903,792

[22] Filed: May 8, 1978

[30] Foreign Application Priority Data

Dec. 30, 1977 [JP] Japan .................. 52-160460

[51] Int. Cl.³ .................. H04R 19/04
[52] U.S. Cl. .................. 179/111 E; 179/180; 179/187
[58] Field of Search .................. 179/103, 111 E, 179, 179/180, 184, 187, 111 R, 121 R, 138, 178

[56] References Cited

U.S. PATENT DOCUMENTS

| 2,205,670 | 6/1940 | Pye | 179/180 |
| 2,697,141 | 12/1954 | Smith | 179/187 |
| 2,791,641 | 5/1957 | Pye | 179/180 |
| 3,414,689 | 12/1968 | Gummel et al. | 179/184 |
| 3,830,988 | 8/1974 | Mol et al. | 179/187 |
| 3,944,756 | 3/1976 | Lininger | 179/111 E |
| 4,070,741 | 1/1978 | Djuric | 179/111 E |

OTHER PUBLICATIONS

*Electrical Communication* vol. 50, No. 2, pp. 123–126, 1975 Tabalba.

Primary Examiner—James W. Moffitt
Attorney, Agent, or Firm—George A. Loud

[57] ABSTRACT

A telephone transmitter in which a cavity is formed in front of a vibrating membrane of the microphone transmitter to thereby reduce wind-noise. The cross-sectional area and volume of the cavity are larger respectively than the cumulative total cross-sectional area and volume of the apertures formed in the mouthpiece of the telephone transmitter. At least one of the apertures may be formed to serve a shielding function to prevent an air stream from directly blowing onto the vibrating membrane, thereby further reducing wind-noise pickup by the transmitter.

3 Claims, 4 Drawing Figures

PRIOR ART APERTURE AND CAVITY ARRANGEMENT USING AN ELECTRET MICROPHONE ELEMENT 0 (dB) = 0.32 (mv)

MICROPHONE UNIT

BACKGROUND OF THE INVENTION

This invention relates to the telephone transmitter portion of a telephone handset and is concerned with reducing wide-noise produced by an undesired air stream blowing into the transmitter-microphone.

Conventionally, several types of microphones have been used in telephone-transmitters, including dynamic microphones and carbon microphones. Such prior art microphones, however, have disadvantages. For example, the dynamic type microphone is costly and complicated in construction. The carbon microphone is also costly, has a narrow bandwidth but a relatively high output voltage, has its peak frequency response at a frequency above the necessary audible range, is unstable in operation, and is relatively noisy. With recent advances in transmission techniques, other types of microphones such as the electret condenser microphone are being considered for use in telephone transmitters. The electret condenser microphone is both low in cost and has a good frequency characteristic.

Microphones such as the electret condenser type, however, have a low mechanical impedence for the vibrating membrane therein and a frequency response characteristic including the low frequency region, often as low as several tens of hertz. Because of these characteristics, means must be provided to minimize pick-up of undesired low frequency wind-noise produced, for example, by the air stream which accompanies breathing and speaking of a talker. Because of the relatively poor low frequency response of prior art microphones, this problem has not previously received widespread attention.

SUMMARY OF THE INVENTION

The present invention relies on the principle of hydrodynamics that, in general, the sensitivity of a microphone to an air stream is particularly large in the direction of vibration of the vibrating membrane of the microphone. According to the present invention, means are provided to decrease the speed of the air stream, thereby decreasing the sensitivity of the microphone to wind-noise.

Accordingly, a primary object of the invention is to provide a microphone unit for a telephone-tramsmitter to reduce wind-noise by including, in front of the vibrating membrane of the microphone, a cavity having predetermined sectional area and volume.

Another object of the invention is to provide an electret condenser microphone having similar construction features and advantages.

A further object of the invention is to provide a microphone unit including a cavity of predetermined sectional area and volume, and including shielding means to minimize the air stream entering the microphone, thereby further reducing wind-noise.

A microphone unit according to the invention includes, in front of a vibrating membrane of the microphone, a cavity to reduce the influence of the undesired air stream which accompanies the speaking of a talker. The cavity has a predetermined sectional area larger than the cumulative total sectional area of the apertures provided in the mouthpiece of the transmitter containing the microphone, and has a predetermined volume which is larger than the cumulative total volume of the apertures. A shielding means may also be formed in the microphone to prevent the air stream from directly blowing against the vibrating membrane.

These and other objects and advantages of the invention will be apparent from the following description taken in conjunction with the accompanying drawings.

DESCRIPTION OF THE PREFERRED EMBODIMENTS

The present invention can be advantageously applied to all types of microphones to reduce sensitivity to wind-noise. Wind-noise is a significant problem particularly in microphones having superior frequency response characteristics. Accordingly, the invention will be described with reference to a preferred embodiment in which an electret condenser type microphone having superior low frequency response characteristics is used.

Figure 1:
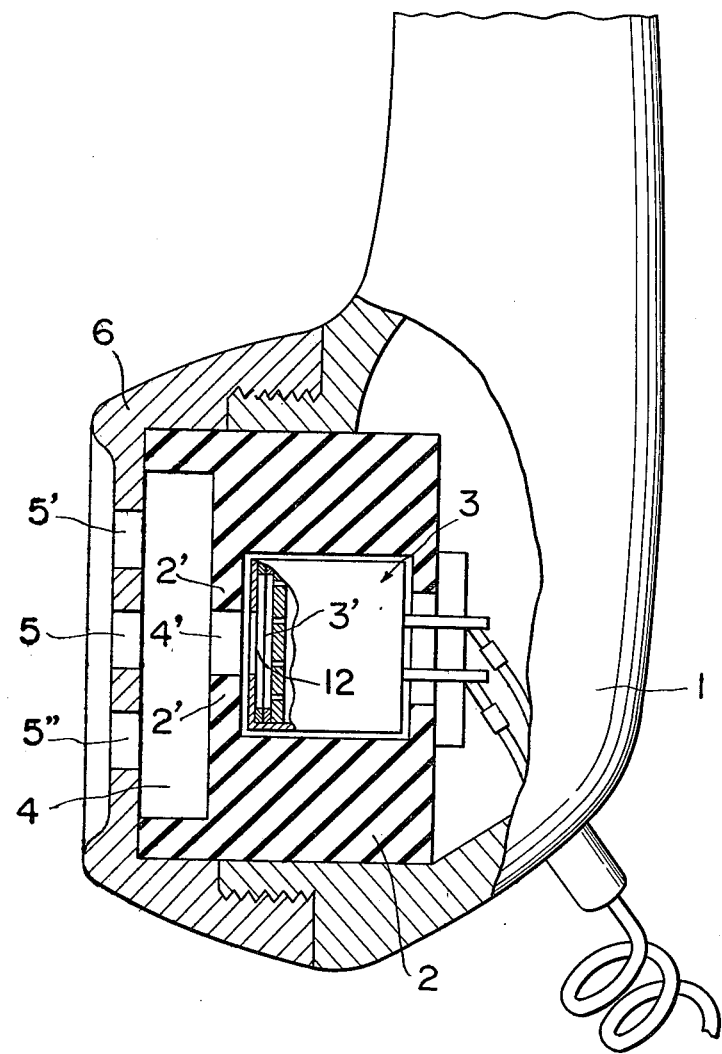
FIG. 1 is a perspective view, partially in cross-section, of a transmitter containing one embodiment of the microphone unit of the invention.

In FIG. 1 a transmitter 1 of a telephone transmitter/receiver houses a microphone unit 2 which, in turn, contains an electret condenser microphone, generally designated a numeral 3. The microphone unit 2 has a cavity 4 of a predetermined cross-sectional area and a predetermined volume which is located in front of resonance cavity 12 which, in turn, is located in front of a vibrating membrane 3' of the electret condenser microphone 3. The cavity 4 includes a passage hole 4' which is defined by a flange portion 2' which is adapted to support the microphone 3 in position.

The cavity 4 is positioned between a mouthpiece 6 provided in the front face of the transmitter 1 and having a plurality of apertures 5, 5', 5" formed therein and the vibrating membrane 3' of the microphone 3. The cavity 4 has a predetermined cross-sectional area which is larger than the cumulative total cross-sectional area of the apertures 5, 5', 5" and has a predetermined volume which is larger than the cumulative total volume of the apertures 5, 5', 5". The cross-sectional area and volume of the cavity 4 may best be determined by experiment to effect a desired reduction in wind-noise as will be further described.

Figure 2:
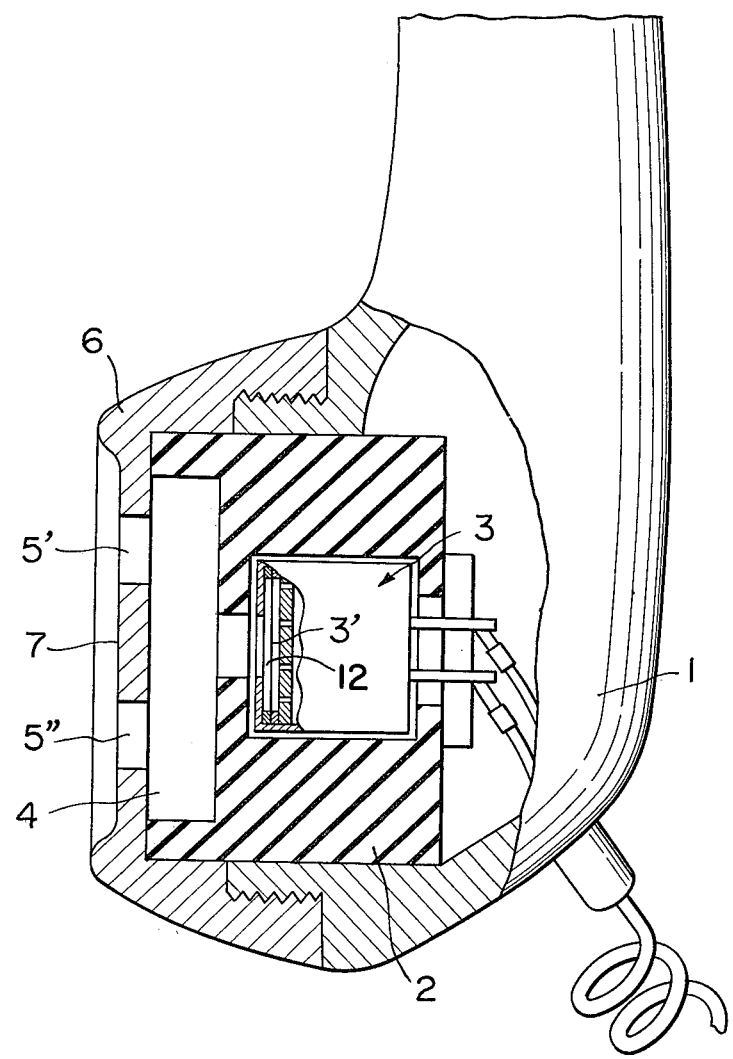
FIG. 2 is a perspective view, partially in cross-section, of a transmitter which contains another embodiment of the microphone unit of the invention.

In a preferred embodiment it is also preferable that the portion of the aperture 5 which centrally confronts the vibrating membrane 3' of the microphone be formed into a shielding part 7 such as shown in FIG. 2 to prevent the air stream from directly blowing against the vibrating membrane of the microphone. The shielding part 7 may be formed to have an area which is equal to or larger than the area of the vibrating membrane 3'. Apertures 5', 5" are provided about the shielding part 7 as shown in FIG. 2.

In a microphone unit according to the invention, part of the air stream produced by a talker and which includes wind-noise is interrupted or blocked by the mouthpiece 6, and part is able to pass through the apertures 5, 5', 5" to enter the cavity 4. Because the cavity 4 has a cross-sectional area and volume which is larger than the cumulative total cross-sectional areas and volumes of the apertures 5, 5', 5'', the speed of the air stream in the cavity 4 will be less than its speed in the apertures due to presence of air confined in the cavity 4 including the passage hole 4' in accordance with the principle of hydrodynamics. The speed of the air stream passing through the cavity 4 will be further decreased by being contained in the cavity 4. Additionally, the air stream entering the cavity 4 will be dispersed in a radial direction to escape through other openings out to the exterior of the microphone.

Because sensitivity of a microphone with respect to an air stream is, in general, proportional to the speed of the impinging air stream, and is particulary large in the direction of vibration of the vibrating membrane of the microphone, it has been found that by decreasing the speed of the air stream as just described and by further diverting the direction of the air stream to a direction which is substantially parallel to the vibrating membrane by means of the shielding part 7 shown in FIG. 2, wind-noise due to the air stream can be reduced to an almost negligible magnitude. On the other hand, it has been found that the sound or speaking voice signal or sound wave is transmitted in a normal manner so that the quality of the reproduced speaking voice is not adversely affected.

Figure 3:
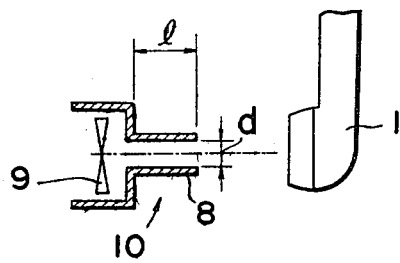
FIG. 3 is a schematic sectional view of a device which was used to measure wind-noise.

The performance of microphone units according to the invention have been compared with prior art microphone units using a testing device 10 as shown in FIG. 3. The testing device 10 consists of a cylinder 8 having an inner diameter of d=3.2 cm, a length of l=8.5 cm, and a fan 9 for generating wind-like testing signals. Wind-like test signals from the testing device 10 having a speed of about 2 m/sec and a spectral distribution in the frequency range from 20 Hz to 20 kHz were sent through the cylinder 8 to the mouthpiece of a transmitter 1 to be tested placed 3 cm from the front end of cylinder 8. Results of the tests are shown in FIG. 4.

Figure 4:
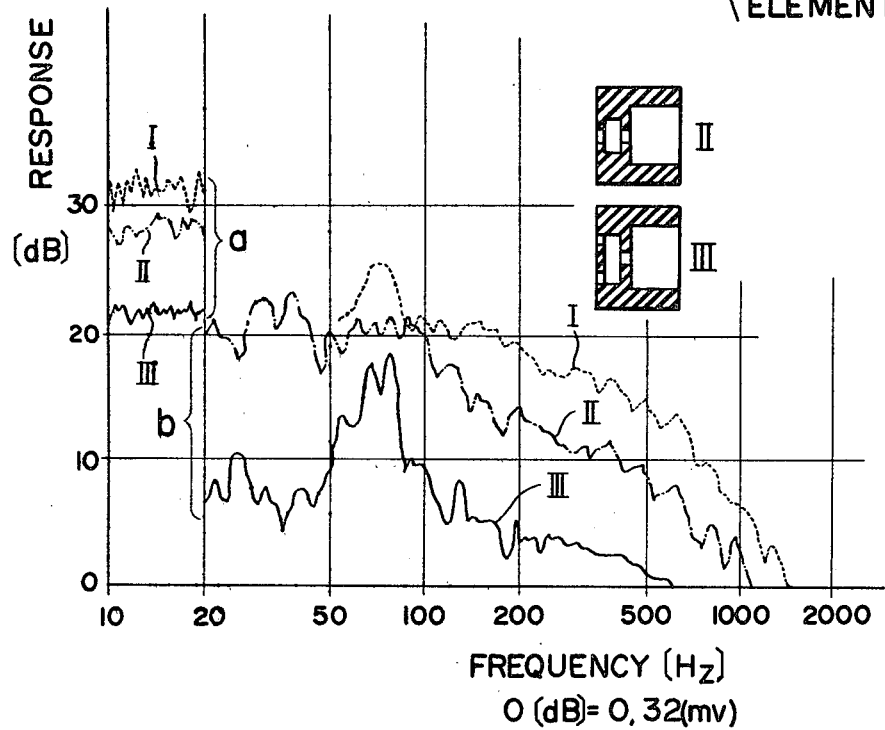
FIG. 4 is a graph comparing the sound frequency characteristics of microphone units of the present invention and that of a prior art microphone unit.

In FIG. 4, curves II and III show the frequency characteristics, respectively, of microphone units II and III which correspond to the constructions of FIGS. 1 and 2, respectively. For comparison, curve I shows the frequency characteristics of a prior art microphone unit. In the region (a) in FIG. 4, the testing wind was sent directly without any obstruction to the mouthpiece of the transmitter. In the region (b) in FIG. 4, the testing wind was passed through a ⅓-octave band-pass filter (not shown) before impinging on the mouthpiece of the transmitter.

Dimensions of the transmitters and microphone units used in the tests are as follows:

|  | I | II | III |
|---|---|---|---|
| Total area of apertures in mouthpiece (cm$^2$) | 0.071 | 0.639 | 0.586 |
| Cross-sectional area of cavity (cm$^2$) | 0.031 | 3.142 | 3.142 |
| Volume of cavity (cm$^3$) | 0.000 | 2.369 | 0.943 |
| (Total area of apertures)/(Cross-sectional area of cavity) | 2.3 | 0.20 | 0.18 |

As shown in FIG. 4, the microphone unit having the construction of FIG. 1 shows a reduction in wind-noise by about 5 to 6 db as compared with the prior art microphone unit. Additionally, the microphone unit having the construction of FIG. 2, i.e., having the shielding part formed therein, shows a 10 to 15 db reduction in wind-noise as compared with the prior art microphone unit. Accordingly, it is seen that microphone units according to the present invention offer greatly reduced sensitivity to wind-noise, can be low in cost, and offer good overall frequency response characteristisc.

Although the invention has been described with reference to particular preferred embodiments, it is to be understood by those skilled in the art that various changes and modifications can be made without departing from the spirit and scope of the invention.

What is claimed is:

1. In a telephone transmitter having a mouthpiece with a plurality of apertures formed therein and including an electret condenser microphone comprising a vibrating membrane and a resonance cavity located within said transmitter, the improvement comprising a second cavity located between said mouthpiece and said electret condenser microphone, said second cavity having a cross-sectional area which is larger than the cumulative total of the cross-sectional areas of said apertures and having a volume which is larger than the cumulative total volume of said apertures whereby the speed of an air stream entering said second cavity through said apertures is substantially decreased in said second cavity thereby substantially reducing the sensitivity of the electret condenser microphone of wind noise.

2. The improvement of claim 1 wherein said mouthpiece includes a central non-apertured shielding part arranged to prevent said air stream from blowing directly against the vibrating membrane of said microphone.

3. The improvement of claim 2 wherein the area of said shielding part is equal to or greater than the area of said vibrating membrane.

* * * * *

UNITED STATES PATENT AND TRADEMARK OFFICE
CERTIFICATE OF CORRECTION

PATENT NO. : 4,263,484
DATED : 21 April 1981
INVENTOR(S) : Yoshinobu Hisatsune et al It is certified that error appears in the above—identified patent and that said Letters Patent is hereby corrected as shown below:

Col. 1, line 27, "ofter" should read ---often---.

Col. 2, line 33, "a numeral 3" should read ---by numeral 3---.

Claim 1, next to last line, "of wind" should read ---to wind---.

Signed and Sealed this

Eighth Day of September 1981

[SEAL]

Attest:

GERALD J. MOSSINGHOFF

Attesting Officer   Commissioner of Patents and Trademarks